(No Model.) 5 Sheets—Sheet 2.
F. G. CORNING.
APPARATUS FOR TRANSFERRING ELECTRIC CAR BATTERIES.
No. 434,579. Patented Aug. 19, 1890.
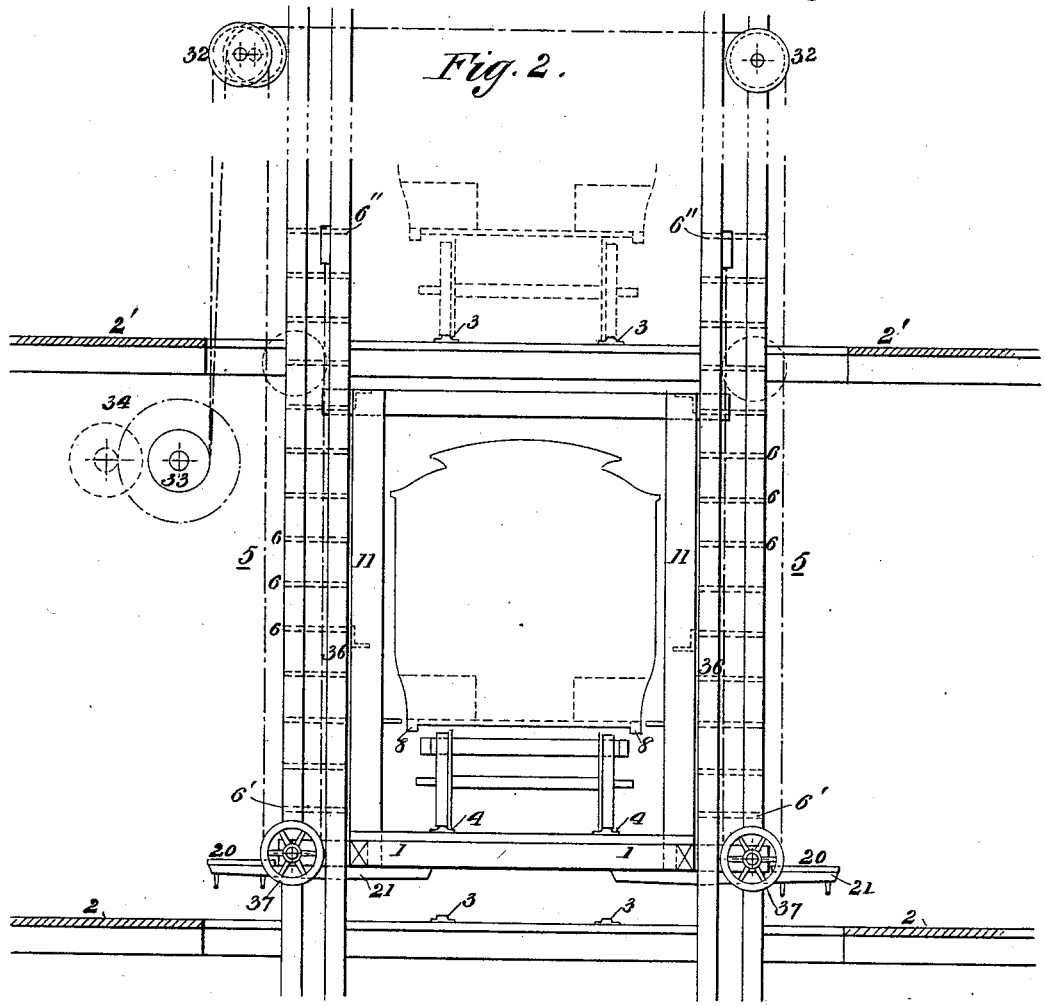
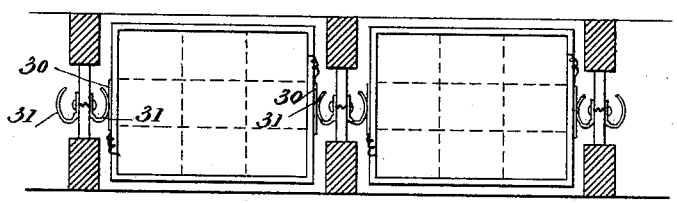
WITNESSES:
INVENTOR

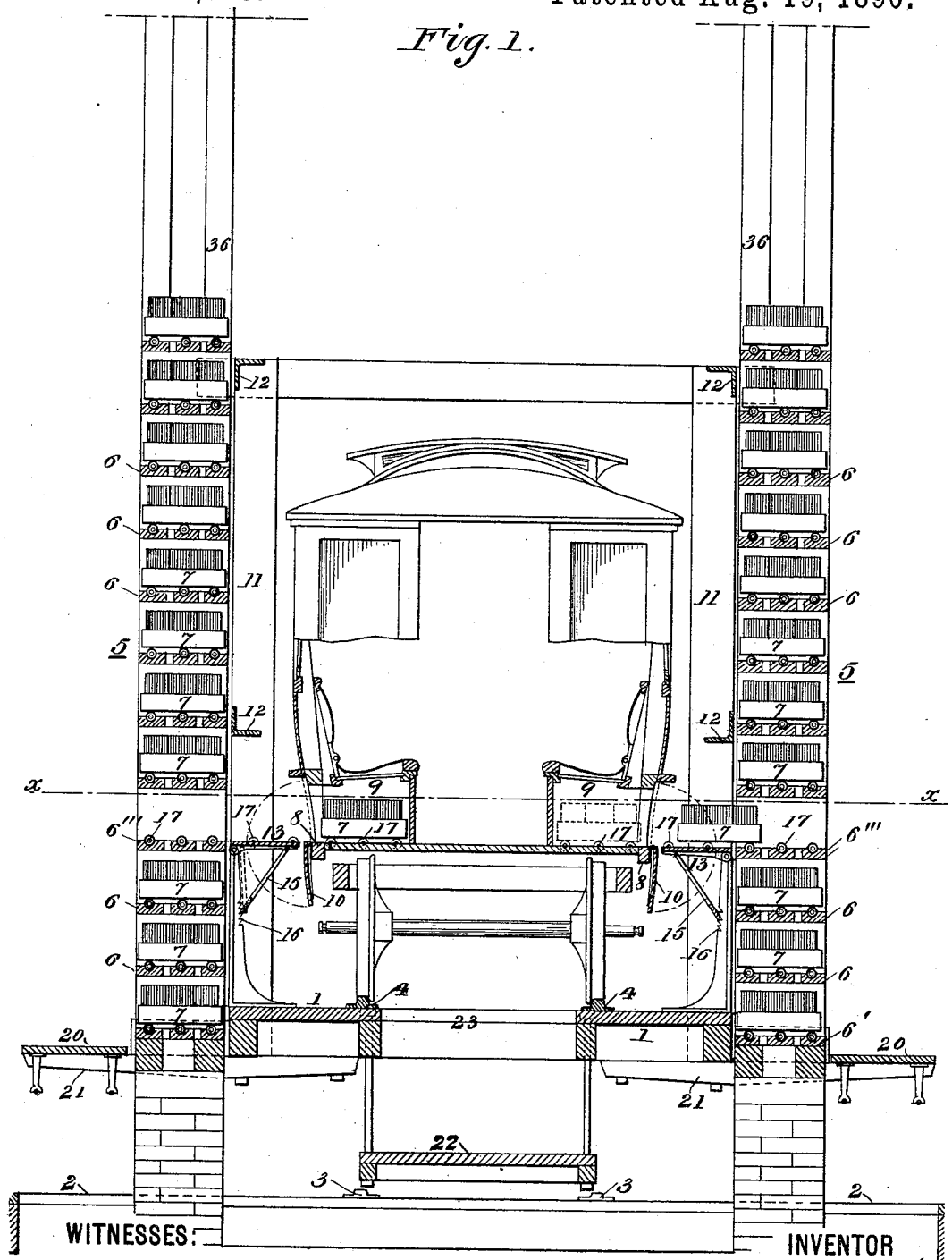

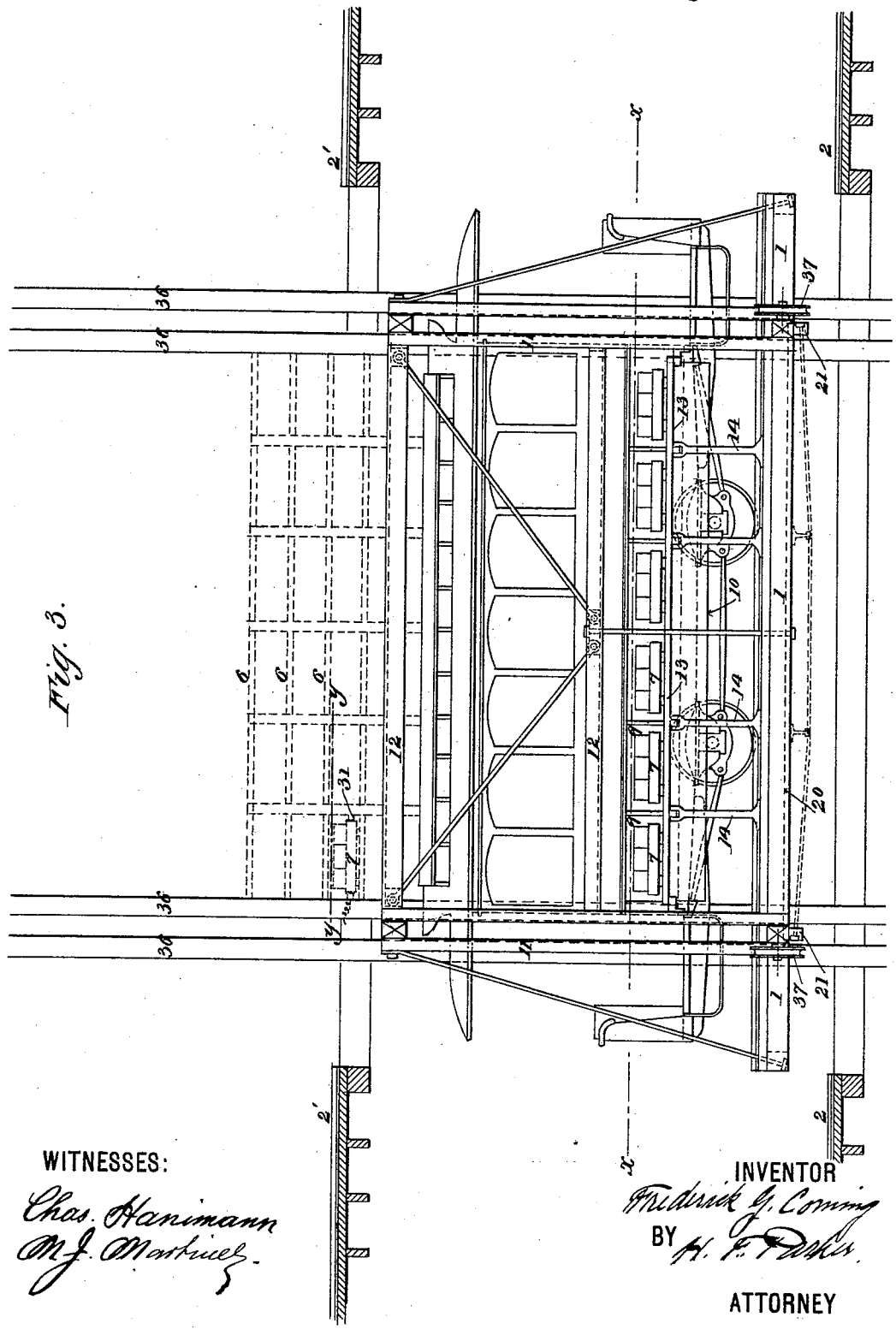

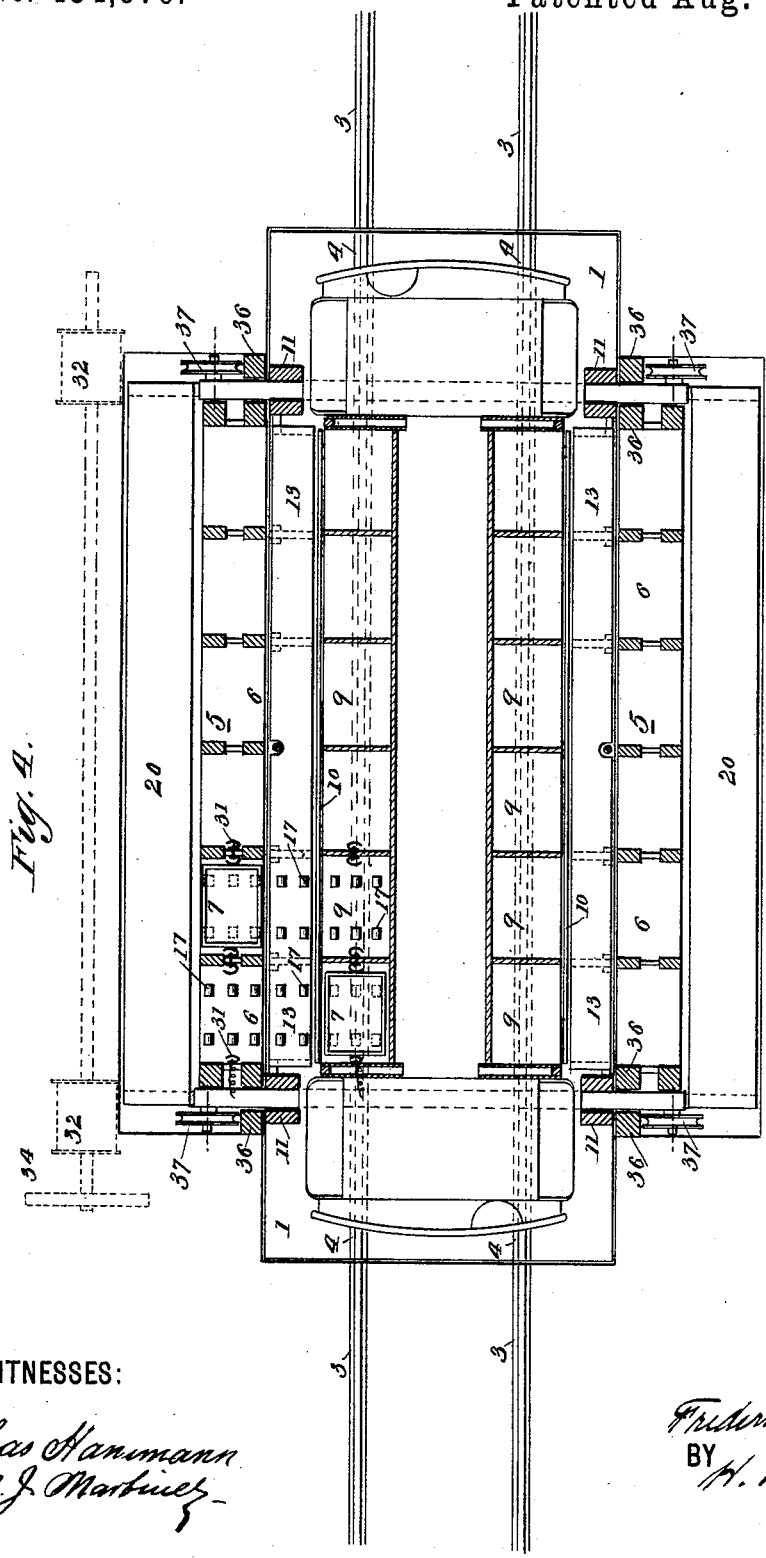

(No Model.)
5 Sheets—Sheet 5.
F. G. CORNING.
APPARATUS FOR TRANSFERRING ELECTRIC CAR BATTERIES.
No. 434,579.
Patented Aug. 19, 1890.
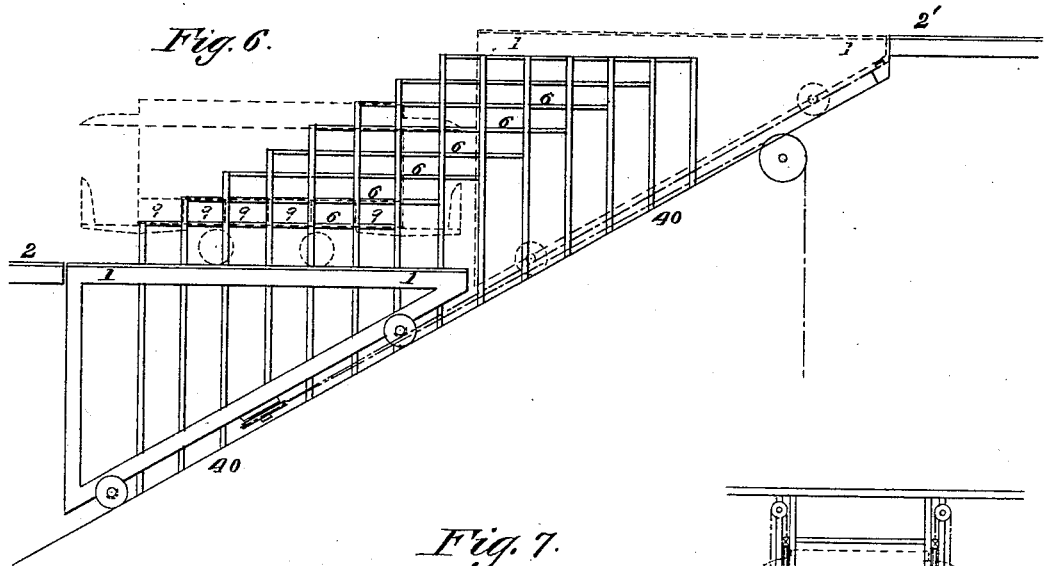
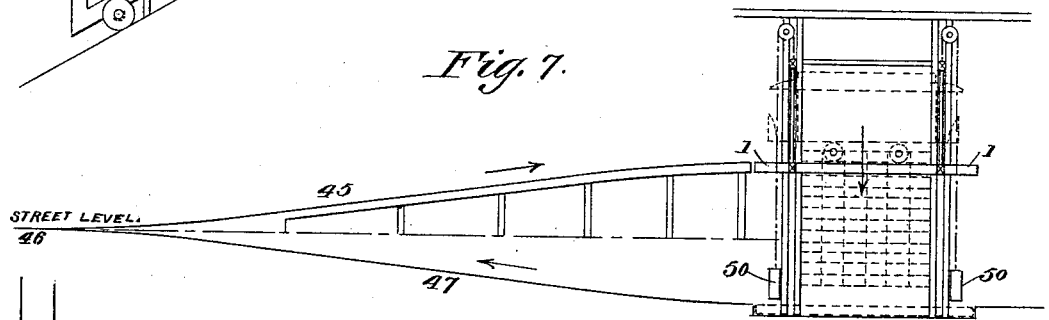
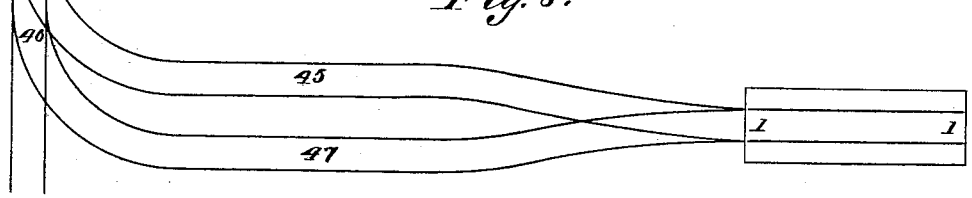
WITNESSES:
INVENTOR
Frederick G. Corning
BY
ATTORNEY

UNITED STATES PATENT OFFICE.

FREDERICK G. CORNING, OF NEW YORK, N. Y.

APPARATUS FOR TRANSFERRING ELECTRIC-CAR BATTERIES.

SPECIFICATION forming part of Letters Patent No. 434,579, dated August 19, 1890.

Application filed May 21, 1890. Serial No. 352,638. (No model.)

*To all whom it may concern:*

Be it known that I, FREDERICK G. CORNING, a citizen of the United States, residing at the city, county, and State of New York, have invented certain new and useful Improvements in Apparatus for Transferring Electric-Car Batteries, of which the following is a specification, reference being had to the accompanying drawings, in which similar numerals of reference indicate corresponding parts throughout, and in which—

Figure 1 is a transverse sectional elevation best showing the essential features of my invention; Fig. 2, an end elevation illustrating on a smaller scale a suitable form of car-elevating apparatus adapted to carry out my invention, and also illustrating the same in conjunction with the different floors of a building. Fig. 3 is a side elevation of Fig. 2, and Fig. 4 a sectional plan view taken on the line $x\,x$, Fig. 3. Fig. 5 is a detail view, enlarged, taken in section on the line $y\,y$, Fig. 3, showing the battery-contacts; and Figs. 6, 7, and 8, diagrams showing certain various modifications, hereinafter more fully referred to.

My invention relates to devices for facilitating the transfer of "secondary batteries" or "accumulators" from an electro-motive car to the recharging shelves or benches, wherein a great extent of charging-space is required to be condensed within a restricted horizontal limit, and wherein a saving of time in transferring the batteries and substituting recharged ones on the car for those exhausted becomes an important object.

My invention consists, in conjunction with one or more vertical series of recharging shelves or benches for the batteries, of a car-hoist for conveying the car from one level to another in a path parallel with the said series of benches and bringing the bed-sill or battery-receiving floor of the car directly opposite and in a coincident horizontal plane with that of any of said benches at will.

My invention consists, furthermore, in the conjunction, with successive floors or levels of a building or other structure whereon the cars are moved or stored and a car elevating and lowering apparatus, of the series of recharging-benches adjacent thereto interposed between or in perpendicular relation to said floors or levels, whereby when the car is conveyed from one to another of such floors or levels for sundry purposes the vertical travel may be utilized to bring the batteries into line with the bed-sill of the car to effect the substitution.

My invention also consists in a transferring-bridge attached to the elevator in the plane of the car bed-sill, forming a continuous surface or way between the car-floor and a coinciding bench in the rack.

My invention, moreover, includes certain other instrumentalities, hereinafter specified, pertaining to the elevator for conveniencing the work of the attendant in transferring the batteries or in obtaining access to different parts of the car irrespective of its vertical motion.

I will proceed to describe such details of construction as are necessary to embody my invention in practical form, it being understood, however, that I do not limit myself to the particular construction of elevator or other parts shown, nor to an elevator moving in an actual vertical line in conjunction with the shelves.

In the several figures, 1 represents an elevator-platform movable at will by any suitable mechanism into different horizontal planes.

2 2' represent a floor or a succession of floors having car-tracks 3 coinciding with those 4 of the elevator when the latter are brought to the level thereof.

5 5 represent the battery-racks, comprising several tiers or vertical series of recharging-benches 6, upon which the battery-trays 7 are received.

8 8 represent the bed-sills of the car; 9, the battery-receiving closets, in which the batteries are usually stored beneath the car-seats, and 10 10 the panels hinged to the bed-sills, which form a part of the sides of the car when closed, and which are shown open in all of the views.

The battery-racks 5 5 may be located in close proximity to the car; but in order to afford access about the sides of the car, as well as to permit the panels 10 to be opened after the car has been moved upon the elevator, a considerable space is left, which space is also utilized for locating portions 11 12 of the frame of the elevator. The space thus left between the bed-sill 8 and the battery-racks 5 is supplemented by the bridges 13, hinged and supported upon the standards 14 upon the elevator. The bridges 13 will invariably occupy the level of the bed-sill of the car, provided the latter be of uniform height; but in order to provide for variance of such height I have arranged adjustable supporting-arms 15, pivoted to the free edge of the bridges, engaging with various notches 16 in the standards 14, whereby to regulate the height of the portion of the bridge adjacent the car. When the substitution of batteries has been effected, the bridges 13 are disengaged and swung down, as indicated by dotted lines in Fig. 1, to clear the panels 10 while the latter are being raised before the passage of the car from the elevator.

The drawings, Figs. 1, 2, and 3, represent the elevator as partly raised above the floor 2. The benches 6 are located in as close proximity vertically as convenience will permit, and one or more pairs thereof—such as 6' or 6''—are preferably located on the level occupied by the bridge 13 and bed-sill of the car when the elevator-platform is coincident with a corresponding floor. Time is thus saved when it occurs that the gang of batteries are to be transferred to or from the bench thus corresponding in height with the bed-sill when the car is first run on the elevator or about to be moved therefrom.

Horizontal shifting of the batteries is facilitated by rollers 17 upon the car-floor, the bridge, and the benches. Such rollers may be located upon the trays themselves, suitable transverse rails being arranged on the benches, car, and bridge.

The usual electrical connections are arranged, whereby each gang of batteries when they are received upon the benches 6 are included in the recharging-circuit. The closing of the circuit is automatically effected by contact-plates 30 on the battery-trays connected to the poles of the battery and corresponding springs 31 in the bench-racks and in the frame of the car. (See Figs. 3, 4, and 5.) The circuit of each charging-bench is thereby initiated as soon as all the batteries of the gang are shifted therein, said circuit being maintained until saturation is reached, which condition is indicated by the ammeter of that particular branch of the circuit pointing to zero.

20 20 represent auxiliary platforms connected to the elevator for the purpose of supporting the operators at a permanent height with respect to the car to enable them to reach the various batteries. The platforms 20 are supported upon transverse beams 21, and, as seen in Fig. 4, the structure thus formed surrounds the pier supporting the benches 5, affording access to all parts.

22 in Fig. 1 illustrates a hanging platform which is located beneath a hatchway 23 in the platform 1, designed for purposes of inspection, &c., simultaneously with the battery-changing operation.

The construction of elevator illustrated in Figs. 1 to 4, inclusive, consists in a platform having uprights 11 11, whereby it is guided in vertical ways 36, and having four cables passing over suitable sheaves 37 32 to the drums 33, Figs. 2 and 4, of a hoisting-winch 34. The hoisting-winch may be driven by an electric motor actuated by the recharging-circuit or other circuit, or the elevator may be driven by a hydraulic or other source of power connected in any suitable or usual manner with the cables. Counter-weights may also be employed to balance the elevator and its load, so that the only power required to move the car vertically will be that necessary to overcome the friction of the cables and sheaves or other lifting devices.

In Fig. 6 the modification included by my invention consists in a construction wherein the elevator is movable upon an inclined plane 40 from the floor 2 to 2', and the bench-rack constructed in inclined series accordingly, whereby the tiers of battery-receiving shelves are successively passed and the battery-closets in the cars brought opposite in coincidence therewith at different stages of ascent or descent.

In Figs. 7 and 8 I have illustrated by side elevation and plan view, respectively, a feature of my improved system, consisting in raising the car by its own motor upon ascending grades and moving said car opposite the battery-racks by its gravity. Successive cars may thereby be switched upon the ascending track 45 and run from the normal level 46 to the highest position of the movable platform 1, thence descending by gravity upon said platform, and subsequently ascending the track 47, returning to the normal level. The platform 1 is in this instance provided with counterbalancing-weights 50, of less total gravity than the platform and car combined, whereby the descent of the platform is caused by the weight of the car and the ascent by the preponderance of the weights. The motion of the elevator may be regulated or arrested opposite any of the benches by means of suitable brake or other mechanism, the gangs of batteries being always substituted in descending rotation. This feature of my invention is more fully described and claimed in my separate patent application, Serial No. 353,808.

The operation is as follows: A spent car having been brought to the proper place upon the platform 1, the panels 10 are opened and permitted to depend vertically and out of the path of the trays 7. The bridges 13 are then raised up to a level with the bed-sills 8 of the car. These preparatory operations are effected while the car is ascending or descending, as the case may be, until its bed-sill arrives on a level with two directly-opposite vacant benches, such as 6''' 6''', Fig. 1. The two gangs of spent batteries are then run out upon the benches and the platform moved to a succeeding or other pair of benches, wherefrom two gangs of charged batteries are loaded into the car. The bridges 13 then being dropped and the panels 10 closed and locked while the platform is moving to its normal level, the car is ready for duty, while no further operation is required. Successive cars may therefore be brought immediately into place—that is to say, while one car is moving off another may be moving upon the elevator in a common direction—the tracks being continuous, if so desired.

The floor 2 (shown in the several views) is presumably at the level of the street, while other floors—such as 2', represented—may be located above or below such level. Assuming that the cars are stored upon the different levels in a building, the act of transferring them from one floor to another may obviously be utilized as a means of changing the batteries by arresting the motion of the car-hoist when the bed-sill of the car arrives opposite different recharging-benches.

Having thus fully described an apparatus and modifications thereof embodying my invention and illustrating the intended scope thereof, what I claim, and desire to secure by Letters Patent, is—

1. In an apparatus for transferring and recharging electric-car batteries, the combination of a rack having several charging-benches arranged in series in different horizontal planes, wherein the batteries are distributed, and a car-hoist for conveying the car from one level to another in a path parallel with the said series of benches.

2. In an apparatus for transferring and recharging electric-car batteries, the combination of a rack having several charging-benches arranged in serial horizontal planes, a car-hoist moving in a path parallel to the direction of succession of the benches, and mechanism for moving or arresting the car-hoist at will, whereby to bring the battery-receptacles in the car opposite the corresponding receptacles in the rack.

3. In an apparatus for transferring and recharging electric-car batteries, the combination of a movable platform or section of car-track for receiving the car and transporting it to different levels, and a pair of charging-racks for the batteries which flank the platform or movable track and its path of movement, for the purposes described.

4. In an apparatus for transferring and recharging electric-car batteries, the combination of a movable platform or section of car-track for receiving the car and transporting it to different levels, the battery-receptacles in the car, and a pair of charging-racks which flank the platforms or movable track and its path of movement, the battery-receiving benches whereof are arranged in pairs occupying common horizontal planes on opposite sides of the car.

5. The conjunction, with the several floors or levels of a building or other structure whereon the cars are moved or stored, and a car elevating and lowering apparatus, of the series of charging-benches, wherein the batteries are distributed, interposed between or in a substantially perpendicular relation to the said floors or levels adjacent the path through which the car ascends or descends, for the purpose set forth.

6. In an apparatus for transferring and recharging electric-car batteries, the combination, with the car-elevator and vertical battery-racks flanking the same, of the auxiliary platforms directly connected to the said elevator and located on the sides of said racks opposite the car, for the purpose set forth.

7. In an apparatus for transferring electric-car batteries, the combination, with the car-elevator, the car having battery-receptacles, and the vertical battery-racks flanking the elevator and its path of movement, of bridges connected to the elevator, supplementing the space between the bed-sill of the car and the benches of the rack.

8. In an apparatus for transferring electric-car batteries, the combination, with the car-elevator, the car having battery-receptacles, and the vertical battery-racks, of bridges the portions whereof adjacent the bed-sills of the car are vertically adjustable, for the purpose set forth.

9. In combination with a car-elevator and a car having battery-receptacles, and battery-racks located in lateral juxtaposition thereto, as described, the bridges filling the intervening spaces between the car and said racks, said bridges being pivoted to standards or other supports on the elevator at those portions adjacent to the racks, so as to swing out of operative position, and adjustable braces for supporting the movable portions of the bridges adjacent the bed-sills of the car.

10. In conjunction with the car-elevator of an electric-car-battery-transferring apparatus, the herein-described depending platform and hatchway in the main platform of the elevator, located beneath the running-gear of the car when the latter is moved into position to be elevated, for the purpose set forth.

FREDERICK G. CORNING.

Witnesses:
CHAS. HANIMANN,
M. J. MARTINEZ.